United States Patent
Brooks

(10) Patent No.: US 8,905,108 B2
(45) Date of Patent: Dec. 9, 2014

(54) METHOD AND APPARATUS FOR APPLYING LABELS TO CABLE

(75) Inventor: Robert Eugene Brooks, Hacienda Heights, CA (US)

(73) Assignee: Encore Wire Corporation, McKinney, TX (US)

( * ) Notice: Subject to any disclaimer, the term of this patent is extended or adjusted under 35 U.S.C. 154(b) by 0 days.

(21) Appl. No.: 13/162,557

(22) Filed: Jun. 16, 2011

(65) Prior Publication Data

US 2011/0240230 A1    Oct. 6, 2011

Related U.S. Application Data

(62) Division of application No. 12/133,355, filed on Jun. 4, 2008, now abandoned.

(60) Provisional application No. 60/941,737, filed on Jun. 4, 2007, provisional application No. 60/985,643, filed on Nov. 5, 2007, provisional application No. 60/985,978, filed on Nov. 6, 2007, provisional application No. 61/020,392, filed on Jan. 10, 2008, provisional application No. 60/970,510, filed on Sep. 6, 2007.

(51) Int. Cl.
*B32B 37/00* (2006.01)
*B65C 3/02* (2006.01)
*G09F 3/00* (2006.01)

(52) U.S. Cl.
CPC ............. *B65C 3/02* (2013.01); *G09F 3/0295* (2013.01)
USPC ........................................... 156/538

(58) Field of Classification Search
CPC ............ G09F 3/0295; B65C 3/00; B65C 3/02
USPC ....... 156/DIG. 6, DIG. 24, DIG. 25, DIG. 37, 156/DIG. 39, DIG. 40, 538, 443, 539, 540, 156/541, 556
IPC ...................................................... B32B 38/18
See application file for complete search history.

(56) References Cited

U.S. PATENT DOCUMENTS

| | | | | |
|---|---|---|---|---|
| 2,402,357 A * | 6/1946 | Bates | | 156/433 |
| 7,465,878 B2 * | 12/2008 | Dollins et al. | | 174/112 |
| 7,812,259 B2 * | 10/2010 | Agan et al. | | 174/112 |
| 7,954,530 B1 * | 6/2011 | Bennett et al. | | 156/358 |
| 8,347,533 B2 * | 1/2013 | Hardin et al. | | 40/316 |
| 2009/0095398 A1 * | 4/2009 | Hardin et al. | | 156/52 |

* cited by examiner

*Primary Examiner* — James Sells
(74) *Attorney, Agent, or Firm* — Warren Rhoades LLP

(57) ABSTRACT

An apparatus for affixing a label to a cable moving in a direction parallel to the cable's axis comprises: a bottom push up roller having a channel configured to receive a moving cable; a first roll down roller configured to fold down a side of a label onto the cable; a second roll down roller configured to fold down a side of a label onto the cable; and a top push down roller having a channel configured to receive a moving cable.

10 Claims, 17 Drawing Sheets

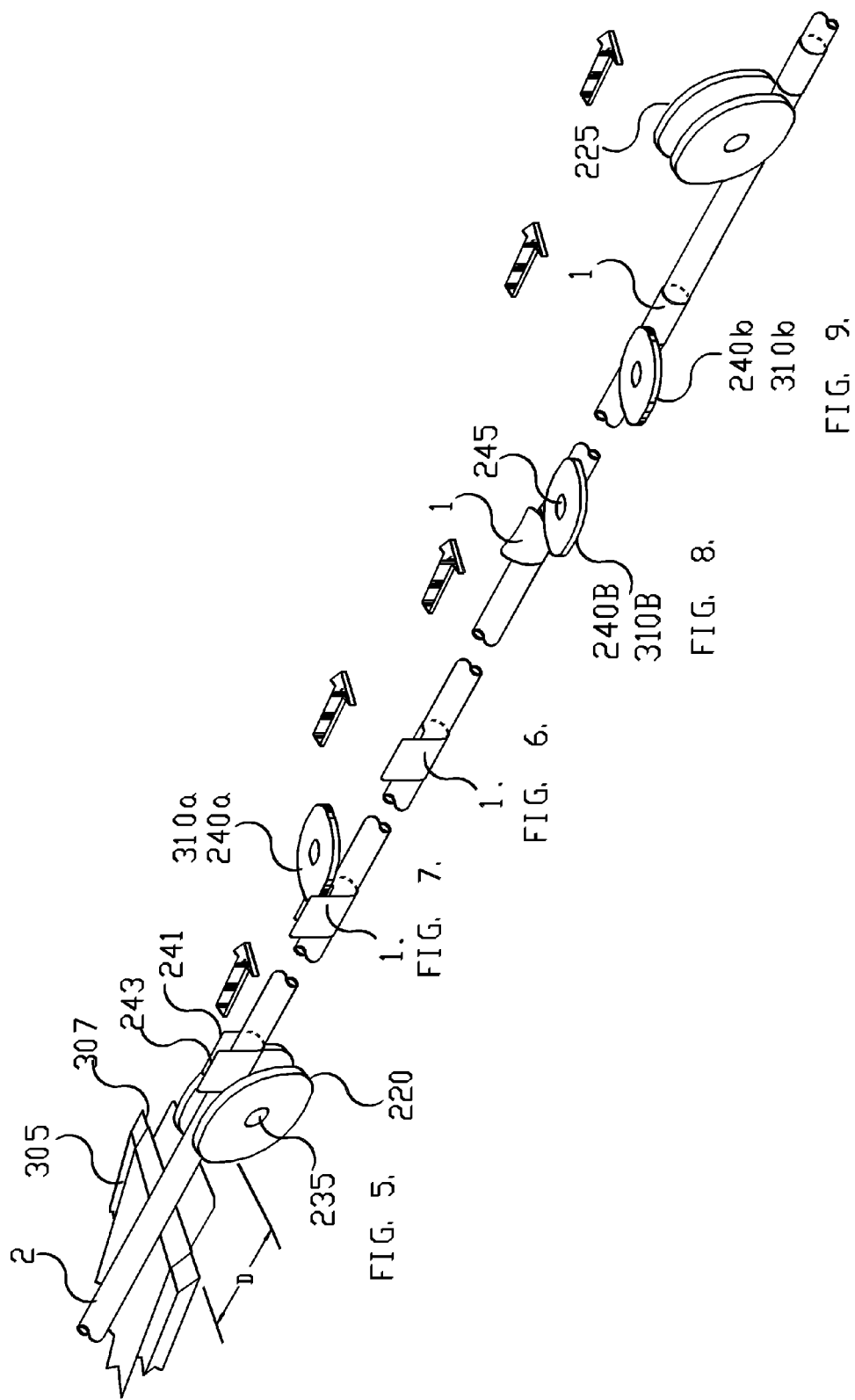

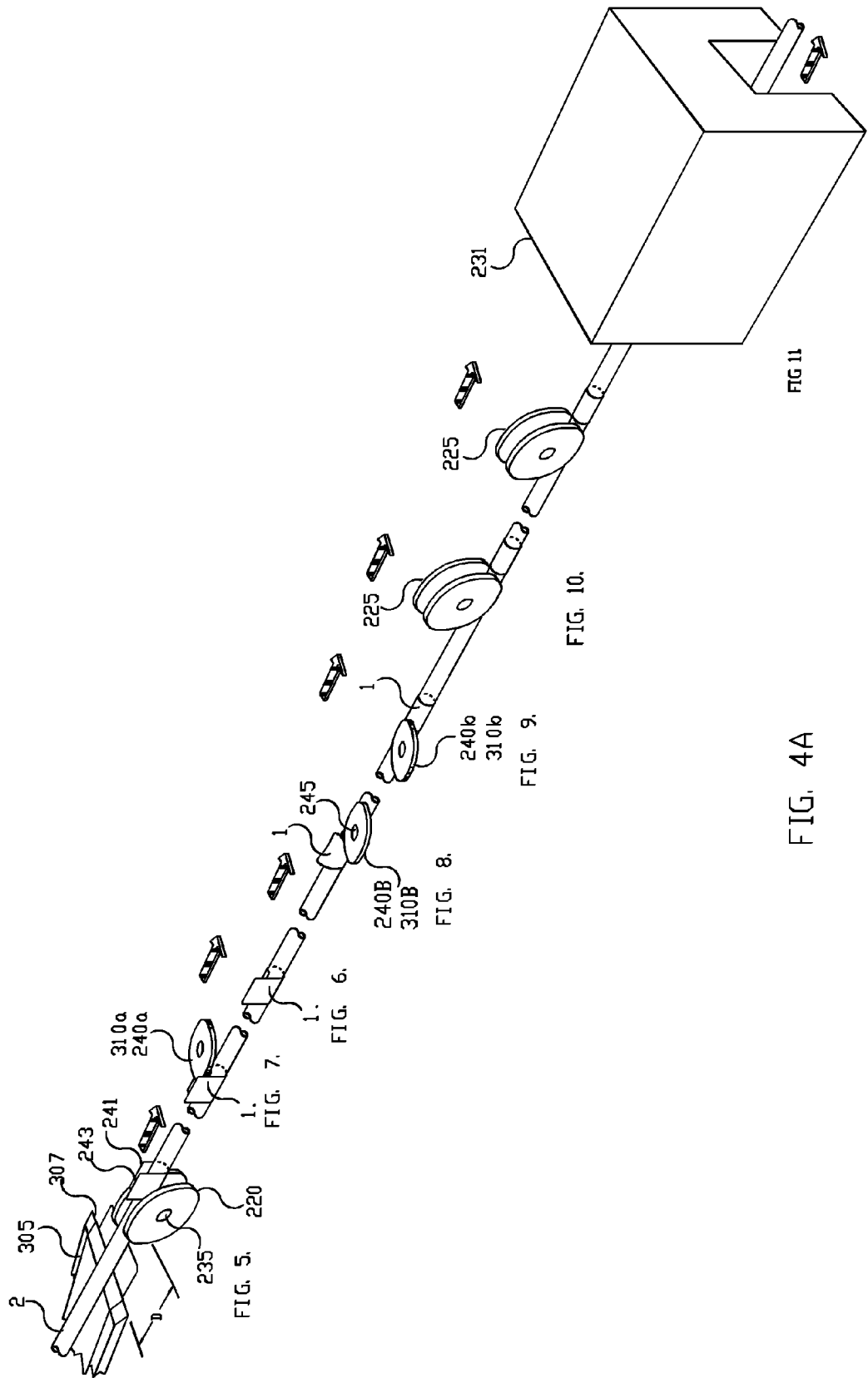

DIRECTION OF CABLE TRAVEL

METHOD AND APPARATUS FOR APPLYING LABELS TO CABLE

CROSS-REFERENCES TO RELATED APPLICATIONS

This Application is a divisional of U.S. patent application Ser. No. 12/133,355 filed Jun. 4, 2008, which claims priority from U.S. Provisional Application Ser. No. 60/941,737, filed on Jun. 4, 2007; U.S. Provisional Application Ser. No. 60/970,510, filed on Sep. 6, 2007; U.S. Provisional Application Ser. No. 60/985,643, filed on Nov. 5, 2007; U.S. Provisional Application Ser. No. 60/985,978, filed on Nov. 6, 2007; and from U.S. Provisional Application Ser. No. 61/020,392 filed on Jan. 10, 2008 The disclosures of the above applications are hereby incorporated herein by reference in the respective entirety of each.

TECHNICAL FIELD

The present invention relates to a labeled cables and apparatuses for affixing labels to cables, and more particularly, some embodiments relate to an apparatus for affixing labels to moving cables.

BACKGROUND OF THE INVENTION

The subject invention generally relates to labeled cables and apparatuses for affixing labels to moving cables.

BRIEF SUMMARY OF EMBODIMENTS OF THE INVENTION

According to one embodiment of the invention, a labeled cable comprises an outer surface having corrugations comprising alternating ridges and grooves disposed on the outer surface; and a label having a label body, the label body having an attaching side having an adhesive disposed thereon, the attaching side attachable to the ridges and spanning across the grooves.

In a variant of the labeled cable, the label body has a thickness of about 1.5 mil to 2.0 mil for maintaining the stiffness of the label body across the grooves.

In another variant, the label is comprised of polyolefin.

In a further variant, the label is electrically conductive.

In still another variant, the label may have electrically conductive adhesive on the attaching side.

In yet a further variant, the label further comprises a human readable side containing human recognizable indicia thereon.

In a another variant, the human recognizable indicia comprises alpha numeric characters.

In a further variant, an apparatus is configured to attach an adhesive type label to a moving cable.

In yet another variant, the apparatus is configured to attach the label to a cable moving along its long axis.

In still another variant, the apparatus is configured for affixing a label to a cable moving in a direction parallel to the cable's axis. The label has front and back sides and a perimeter. The apparatus is configured to affix the label to the cable in a manner in which the label wraps completely around a perimeter of the cable. The apparatus may comprise: a bottom push up roller having a channel configured to receive a moving cable; a first roll down roller downstream of the top push up roller disposed lateral to the moving cable and configured to fold down a side of a label onto the cable; a second roll down roller downstream of the first roll down roller disposed lateral to the moving cable on a side opposite to the first roll down roller and configured to fold down a side of a label onto the cable; and a top push down roller having a channel configured to receive a moving cable.

In another variant, the apparatus is configured to affix the label to the cable in a manner in which the back side of the label is partially flush with an outer surface of the cable.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 4 illustrates an overview of a preferred method of operation of the components of an apparatus for affixing labels to a moving cable illustrated in FIGS. 5-10;

FIG. 4A illustrates an overview of a preferred method of operation of the components of an apparatus for affixing labels to a moving cable illustrated in FIGS. 5-11;

FIG. 12A is a front view of a bottom push up roller in operation;

FIG. 12B is a front view of first and second roll down rollers in operation;

FIG. 12C is a front view of a member for pushing a label to one side in operation;

FIG. 12D is a front view of a top push down roller in operation;

FIG. 12E is a cross sectional view of a label with sides positioned upward with disparate heights;

FIG. 12F is a cross sectional view of a tamp pad in an initial stage of operation;

FIG. 12G is a cross sectional view of a tamp pad in a subsequent stage of operation;

FIG. 13A depicts a tamp pad;

FIG. 13B depicts labels moving onto the tamp pad perpendicular to the direction of motion of the cable;

FIG. 13C depicts a tamp pad with a label disposed thereon moving upward toward a moving a cable;

FIG. 13D depicts a tamp pad attaching a label to a moving cable;

FIG. 13E depicts a label after it is attached to the cable by the tamp pad;

FIG. 13F depicts a bottom push up roller in operation;

FIG. 13G depicts a first roll down roller in operation;

FIG. 13G1 depicts an alternative embodiment for rolling down a label to a moving cable;

FIG. 13H depicts the label after being operated on by the first roll down roller;

FIG. 13I depicts a second roll down roller in operation;

FIG. 13J depicts the second roll down roller in a later stage of operation;

FIG. 13K depicts a top push down roller in operation; and

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention is directed toward a labeled cable and an apparatus for affixing a label to a moving cable, and more particularly some embodiments are directed to a labeled corrugated cable and apparatuses and methods of applying a label to the cable.

Figure 1:
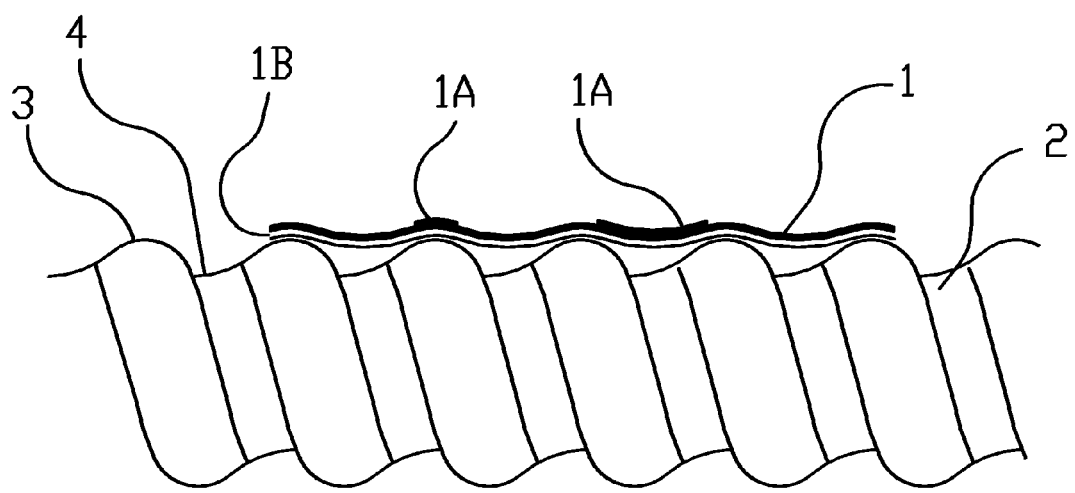
FIG. 1 is an illustration of a preferred labeled cable.

In one embodiment, referring to FIG. 1, a smooth, attachable, printable label 1 is affixed to the sheath of a corrugated cable 2. The label has a label body 1a that bridges across the grooves 4 adjacent to and alternating between the ridges 3 of the sheath of the cable. The body of the label 1a may wrap around the cable more than 360 degrees for best retention to the cable. The label body may have an adhesive on the side of the label that attaches to the cable 2 and should be of a thickness that prevents the label from dipping down into the grooves 4 of the sheath when it is attached to the cable. The adhesion of the label to the ridges 3 permits the label to conform to the circumference of the sheath and stay attached to the ridges of the sheath. In a preferred embodiment, the thickness of the label is between 1.5 to 2.0 mil. When the body of the label is wrapped around the cable more than 360 degrees, it will overlap itself and adhere to part of itself, which provides more adherence and longevity of its life and purpose which, in one embodiment, is to display information regarding the cable, however any type of information may be displayed. The body of the label after it is attached to the sheath of the cable, provides a continuous surface with a relatively flat configuration that may serve as a canvass to paint on or print on.

In one embodiment, the label 1 may comprised of electrically conductive material such as electrically conductive polyofelin and may include an electrically nonconductive adhesive.

Figure 2:
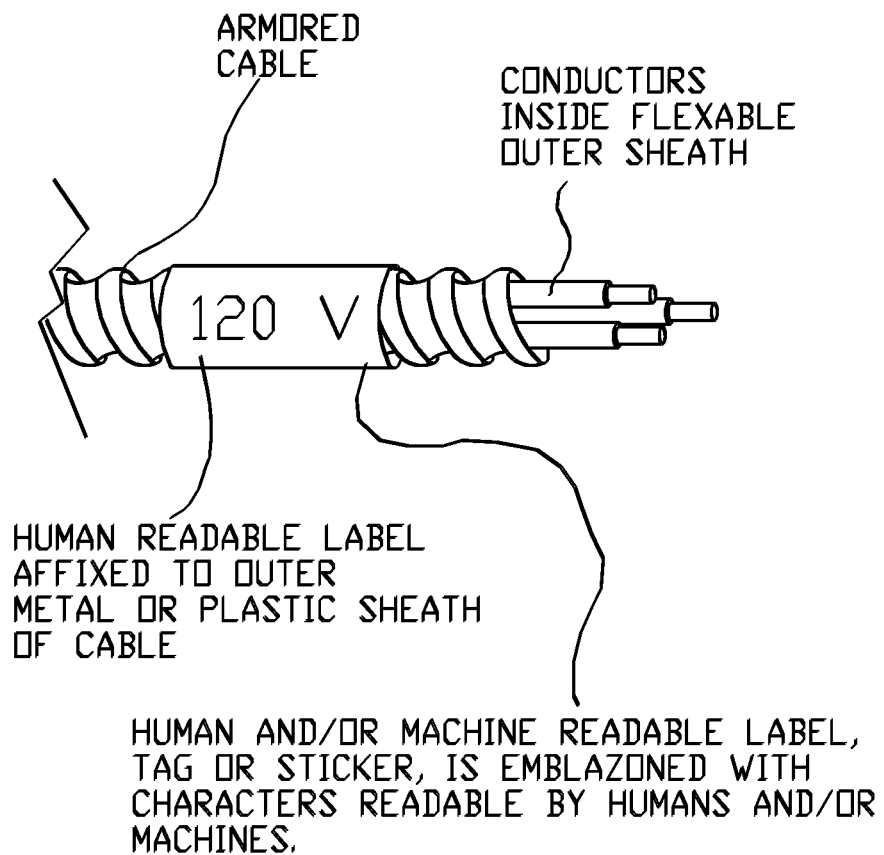
FIG. 2 is perspective view of a labeled cable.
Figure 2A:
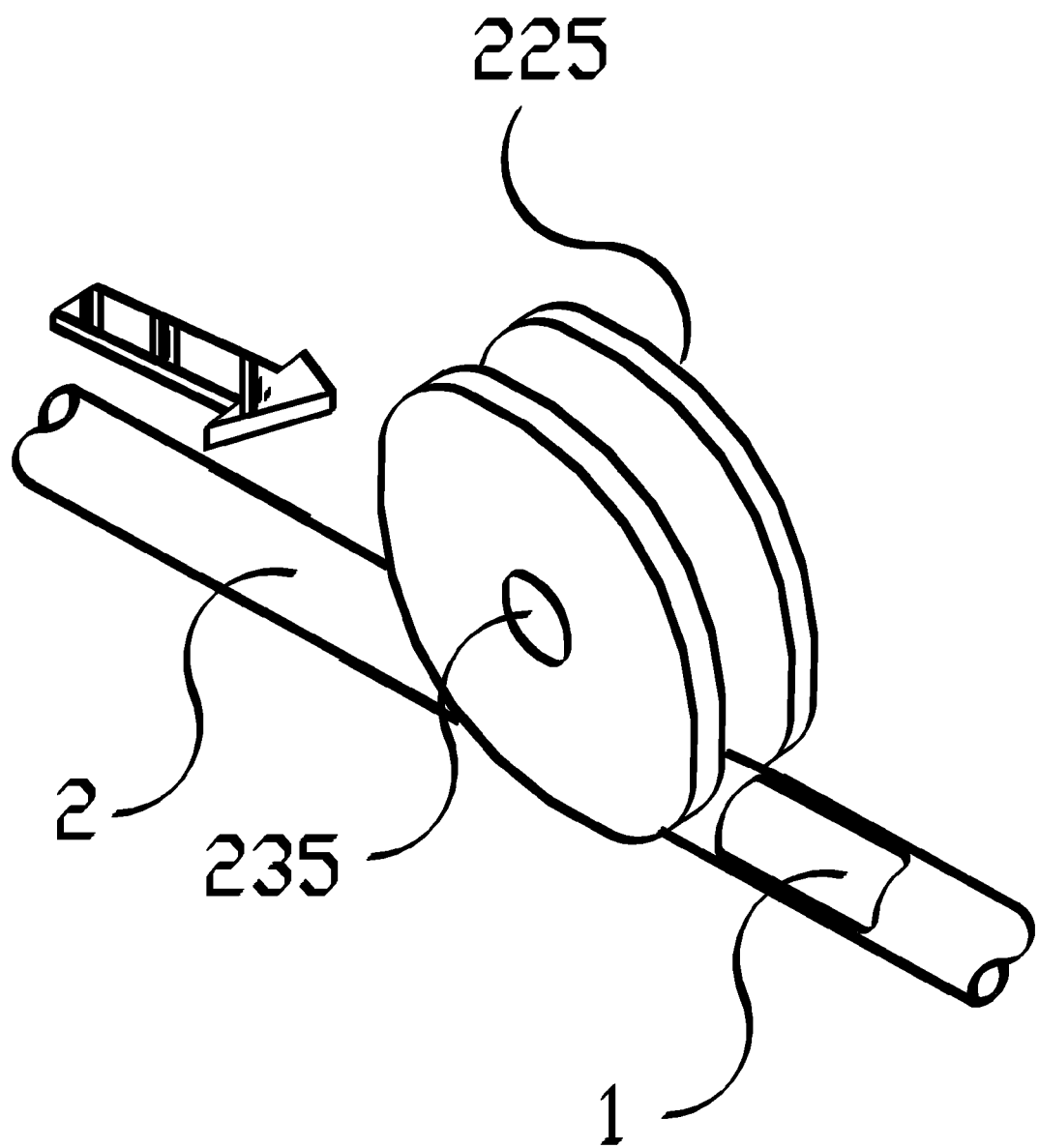
FIG. 2A depicts a roller forming part of an apparatus for affixing labels to a moving cable.
Figure 2B:
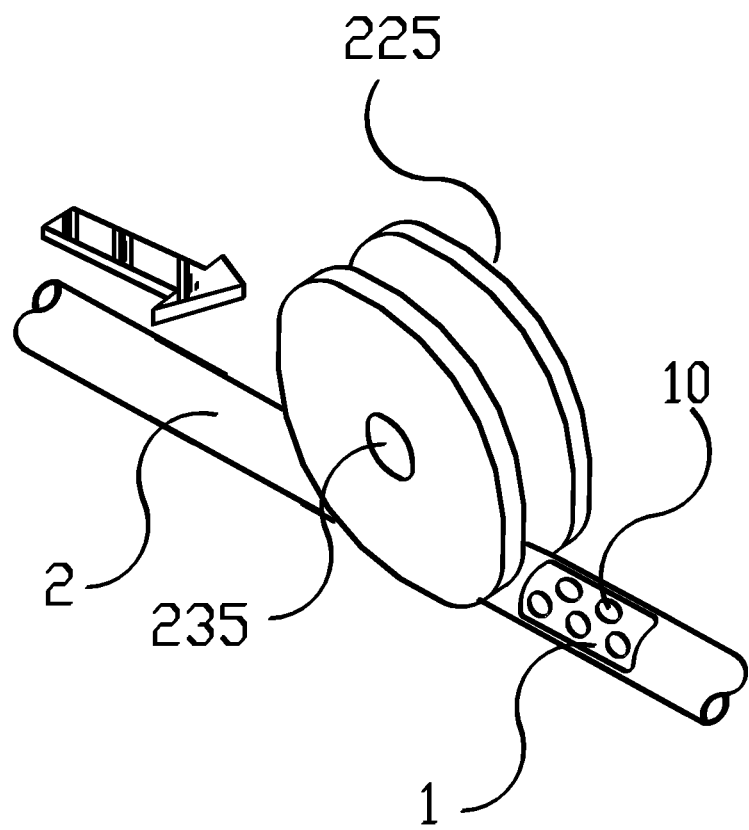
FIG. 2B depicts a roller and a label with holes disposed thereon attached to the cable.

In another embodiment, referring to FIG. 2b, the label has holes 10 disposed throughout label that penetrate completely through. When the label is placed on the cable 2, the holes 10 serve to prevent the label 2 from impeding the flow of electrical current. For example, if the cable 2 is feeding into an electrical junction box, it is often desirable to ground the cable via electrical contact with the junction box. If the point of contact between the cable and the junction box happens to line up with a labeled portion of the cable, the holes 10 allow for electrical contact between the labeled portion of the cable and the junction box.

In an example implementation of the invention shown in FIG. 2, an MC or AC type 277-volt flexible armored cable includes several internal conductors and a readable label affixed and displayed on the outer surface of the sheath that is emblazoned with letters of any alphabet. In this example, there is no need to print information on the cable itself, as the label provides the substrate for printing. Persons who install or maintain a labeled cable in accordance with the embodiments of the invention, can quickly and instantly read the labels to identify the conductors in the particular type of cable, such as their gauge, voltage rating, etc., even though they may not be able to see the insulation on the internal wires. They can also recognize the cable as being of type MC or AC based on the writing on the label. Knowing the type or function of a given cable without seeing the insulations on the internal wires, and without having to memorize a code, can save time and reduce hazards.

Referring to FIG. 2, to indicate that the cable is of the particular type, a label is affixed around the circumference of the outer surface of the sheath. In one example, the label has writing 1b on it to coincide with the insulations and to indicate the type of the conductor inside the MC or AC cable, thus relieving the person looking for information pertinent to the cable from having to have knowledge in deciphering a code for cables, that my for example include colors, dots, dashes, stripes, bands, solid colors, and any other patterns and indicia requiring a particular knowledge, for cables, in order to quickly obtain information regarding the cable.

A sequence of labels can be repeated all along the length of the cable. In one embodiment, labels may be placed on successive sections of a steel or metal cable as it is dispensed from a feed roll and just before the strip enters a forming machine where it is convoluted.

In the case of a labeling machine that applies the label while to a moving steel strip just before it enters the forming (convoluting) machine, the labeling machine must be able to switch labels quickly and to apply and cure or shrink the label in a short time between when the strip arrives at the labeling machine and when it is delivered into the forming machine.

The labels may be a tag or sticker, for identifying a continuous processed cable, wire, conductor, hose, tube, rod, belt, cord of round, oval, rectangular or other cross sectional shape, that is attached to the outside surface at certain intervals and are emblazoned with human and/or machine readable markings or indicia.

In one preferred embodiment, the label body may be composed of polyolefin and have a thickness from 1.5 mil to 2.0 mil. However, the label body may be any other shrinkable or non-shrinkable material, or polyester or other plastic or elastomer or paper or a thin, film type metal or natural, organic or inorganic substance or material that will conform to the shape of the cable, wire, conductor, hose, tube, rod, belt, cord of any cross sectional shape.

In another embodiment, depicted in FIG. 2*a*, the label body may wrap around the cable less than 360 degrees around the outer surface of a continuous processed, cable, wire, conductor, hose, tube, rod, belt, cord of any cross sectional shape.

In a further embodiment, the label body does not attach continuously along the length of said cable, wire, conductor, hose, tube, rod, belt, cord of a particular cross sectional shape but is attached at certain intervals and thus requires the tag, label, to be of certain length along the cable, wire, conductor, hose, tube, rod, belt, cord of said cross sectional shape.

In one implementation of affixing a label to a cable in accordance with the present invention is attaching the label onto the cable after the cable is being manufactured, for example, after being helically wrapped with metal sheathing.

Figure 3:
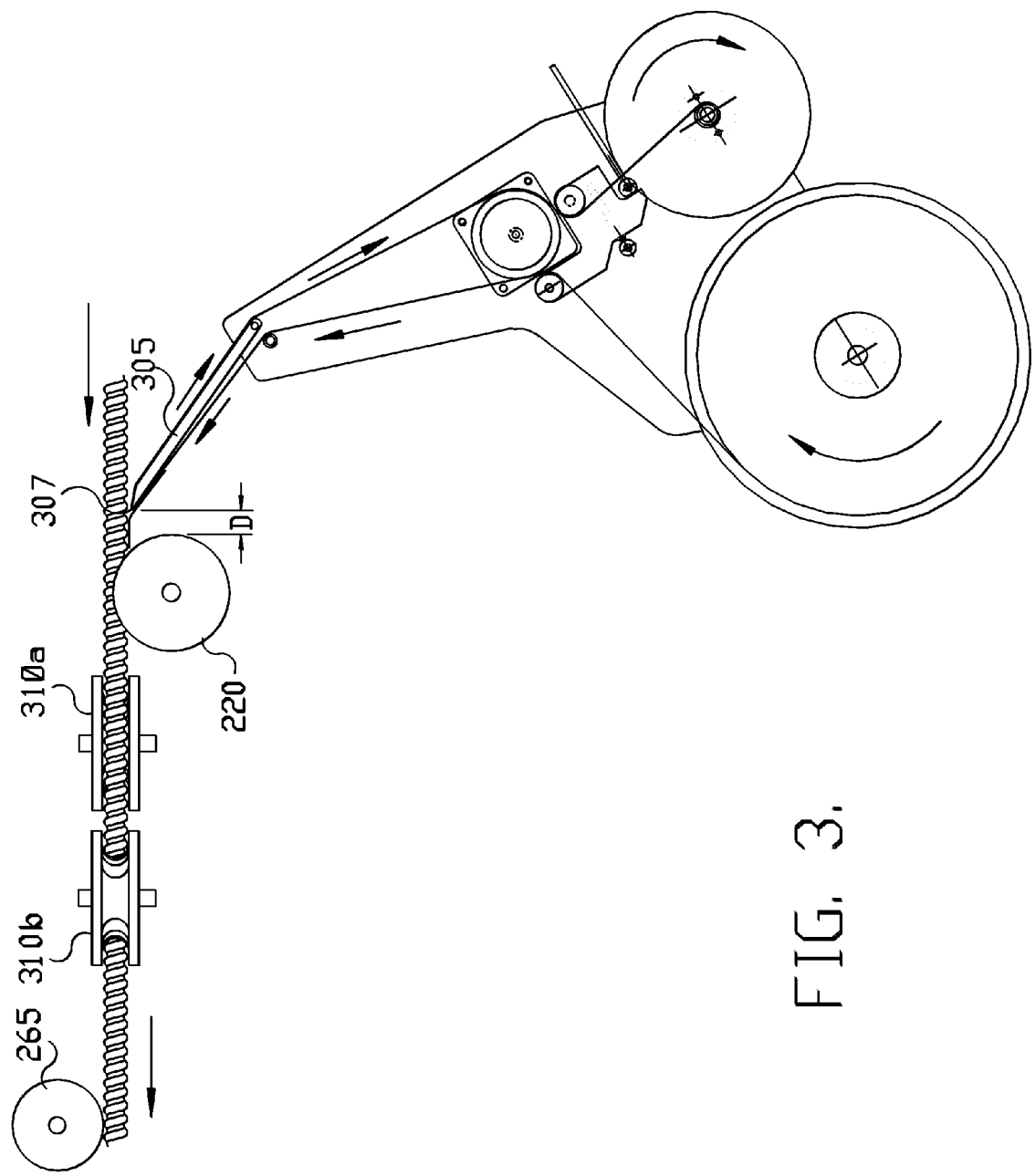
FIG. 3 depicts a partial side view of an apparatus for affixing labels to a moving cable.
Figure 5:
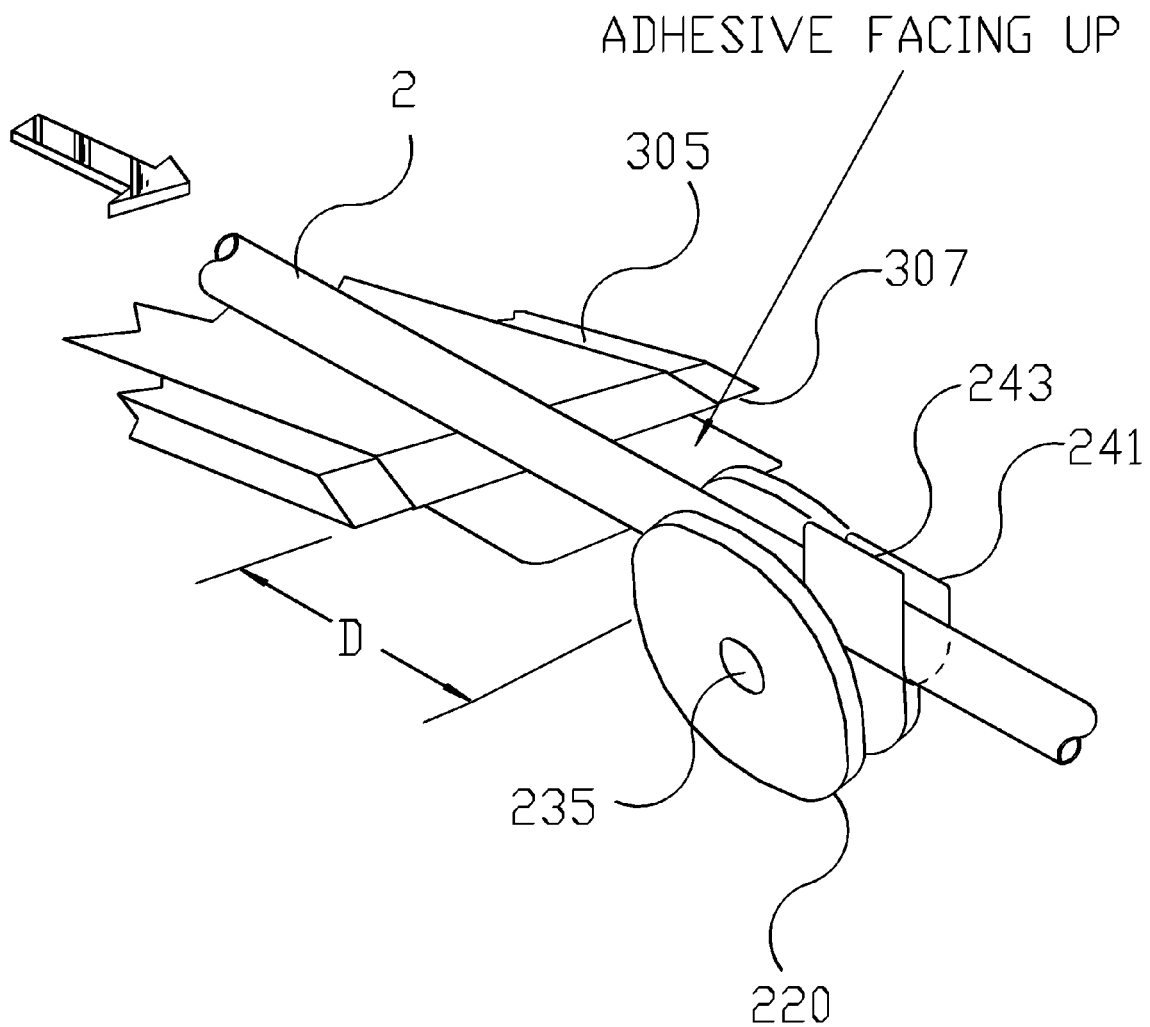
FIG. 5 depicts a bottom push up roller and a peel blade.
Figure 6:
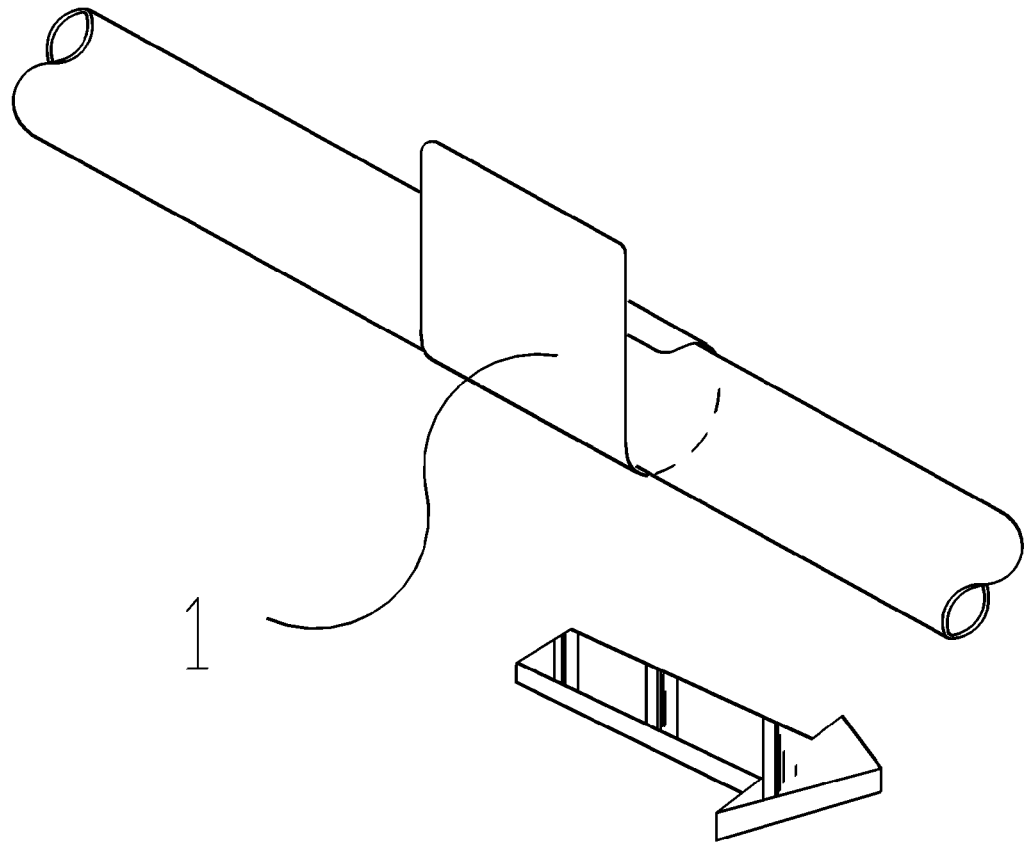
FIG. 6 depicts the state of a label after being operated on by a first roll down roller.

FIGS. 3-10*a* depict one embodiment of an apparatus for affixing one or more labels to a cable moving in line with the cable's axis. The labels have front and back sides and a perimeter. Referring to FIG. 3, the apparatus includes a label dispenser having a speed of dispensing labels that is adjustable and synchronized with the linear speed of the moving cable. A bottom push up roller 220 is separated by a distance D from an edge 307 of a peel blade 305 of the dispenser. The distance D is determined based on the stiffness of a label as it detaches from its backing strip. The distance D will necessarily be less than the length of a label 1. The labels 1 dispense with the adhesive side facing up as shown in FIG. 5. In one example, the dispenser and the peel blade 305 are positioned to dispense and peel labels 1 in the same direction as the motion of the cable 2 moving along its axis.

In one embodiment, the cable 2 may be positioned to move over the peel blade 305 at a point 309 along the edge 307 so that the label will form an unequal U shape around the cable when received by the bottom push up roller 220. Referring to FIG. 4A and FIGS. 5-11, depending on the point 309 where the cable moves over the labels 1 moving off the peel blade is positioned, the disparity 242 in height of the sides 241, 243 of the label as it is formed into a U shape may be adjusted. For example, if the cable is centered on the labels, the sides 241, 243 of the sides of the U shape label will be equal in height. As the cable is positioned further from a center line of the labels, the more unequal the heights of the sides 241, 243 will be when folded up into the U shape.

Figure 12:
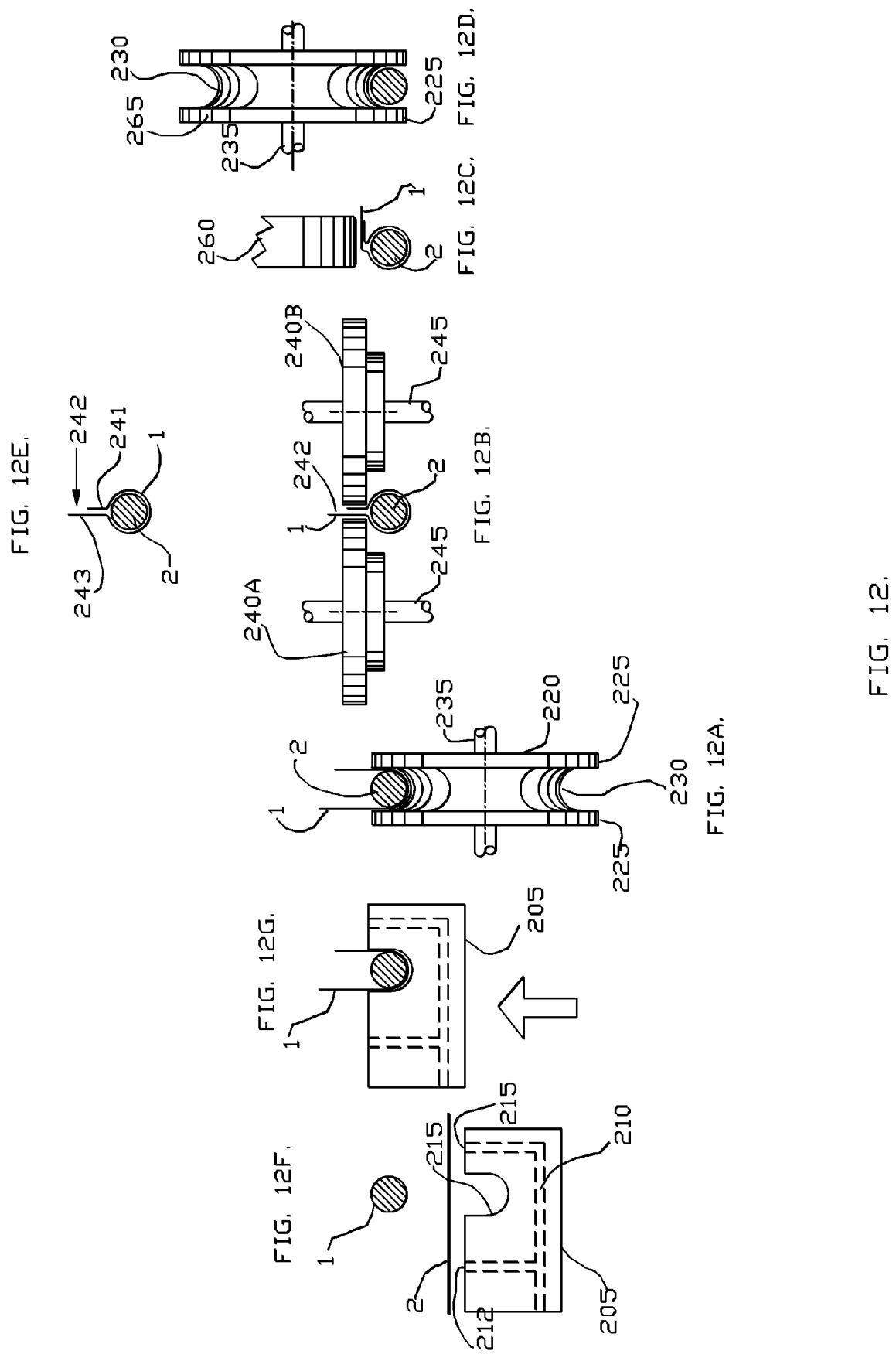
FIG. 12 depicts FIGS. 12A-12G, which depict an operational flow diagram of an embodiment of an apparatus for affixing labels to a moving cable.

Referring to FIGS. 5 and 12, the bottom push up roller 220 has a channel 230 configured for receiving a cable 2 to be labeled, and the channel 230 is bounded by side walls 225.

The roller 220 is configured for folding a label into a U shape around the cable as the cable and label enter the roller 220. The roller 220 is rotatable about its axis 235 and the axis 235 is perpendicular to the direction of travel of the cable 2. The bottom push up roller 220 is disposed below the moving cable 2 so the cable moves between the side walls 225. The side walls may assist in affixing the adhesive backed label to the cable 2.

Figure 7:
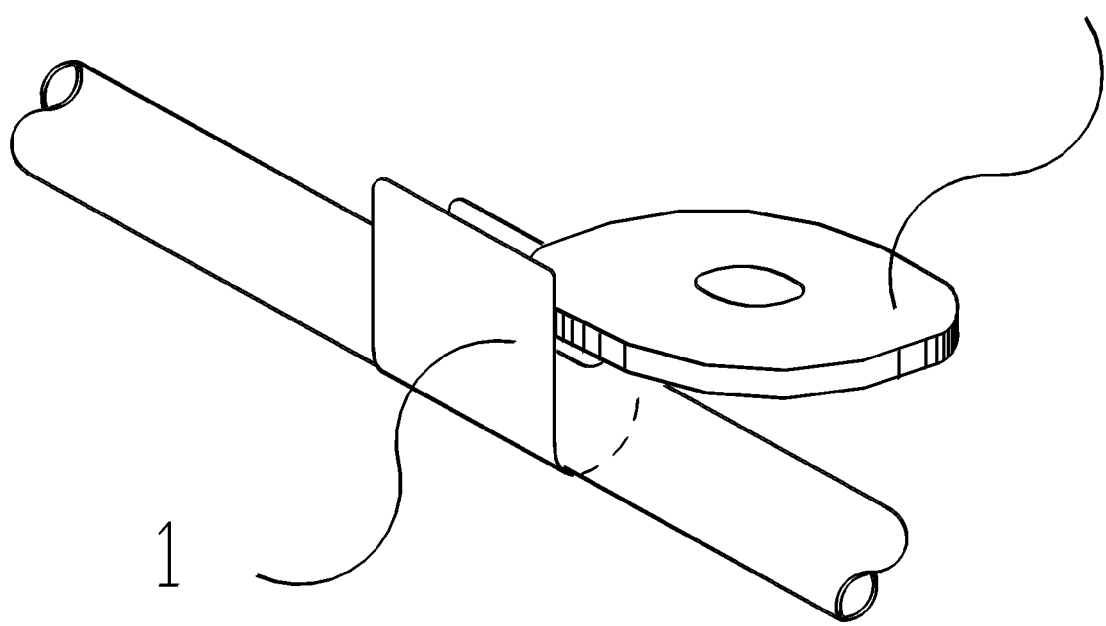
FIG. 7 depicts a first roll down roller in operation.
Figure 8:
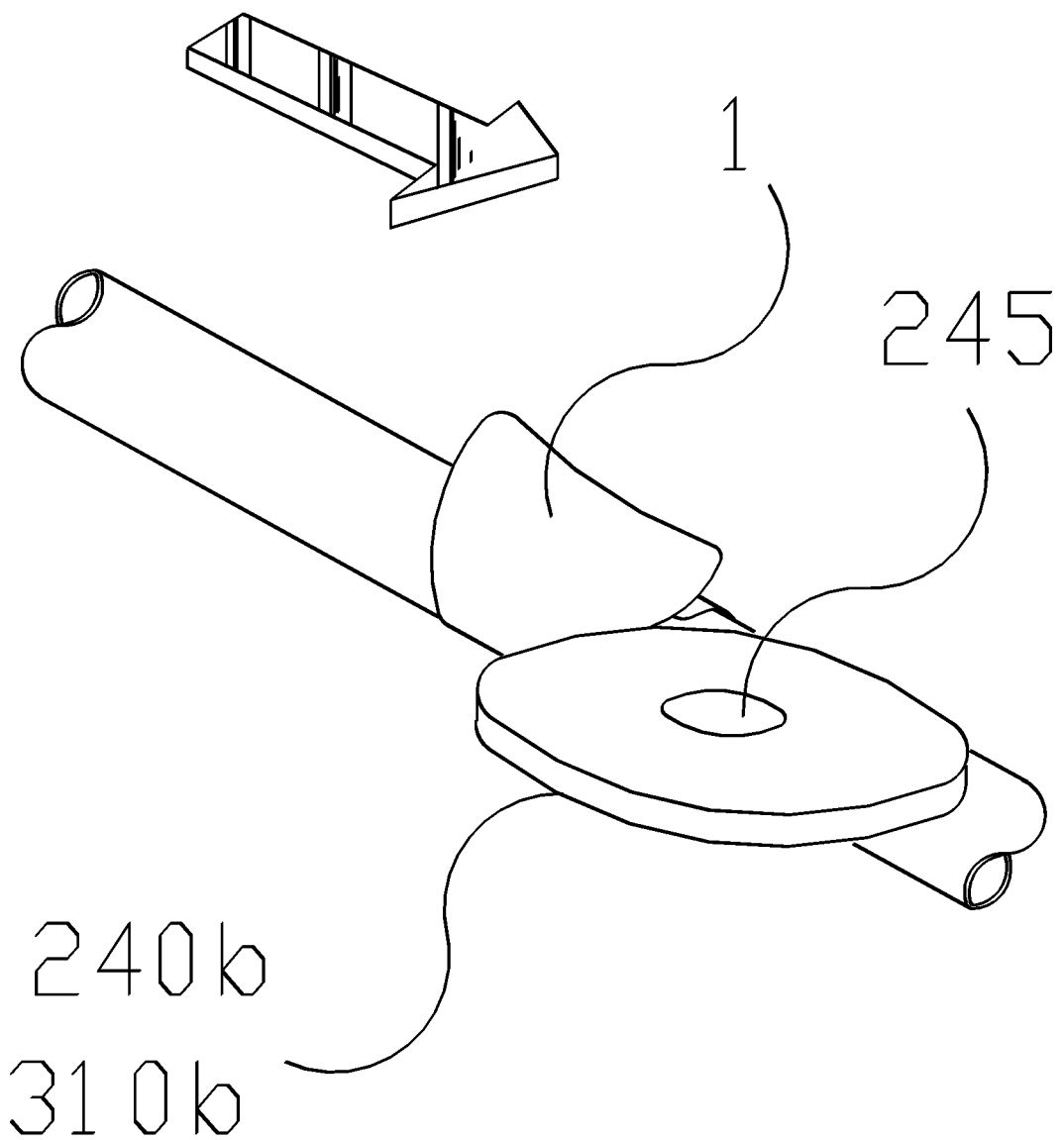
FIG. 8 depicts a second roll down roller in an initial stage of operation.
Figure 9:
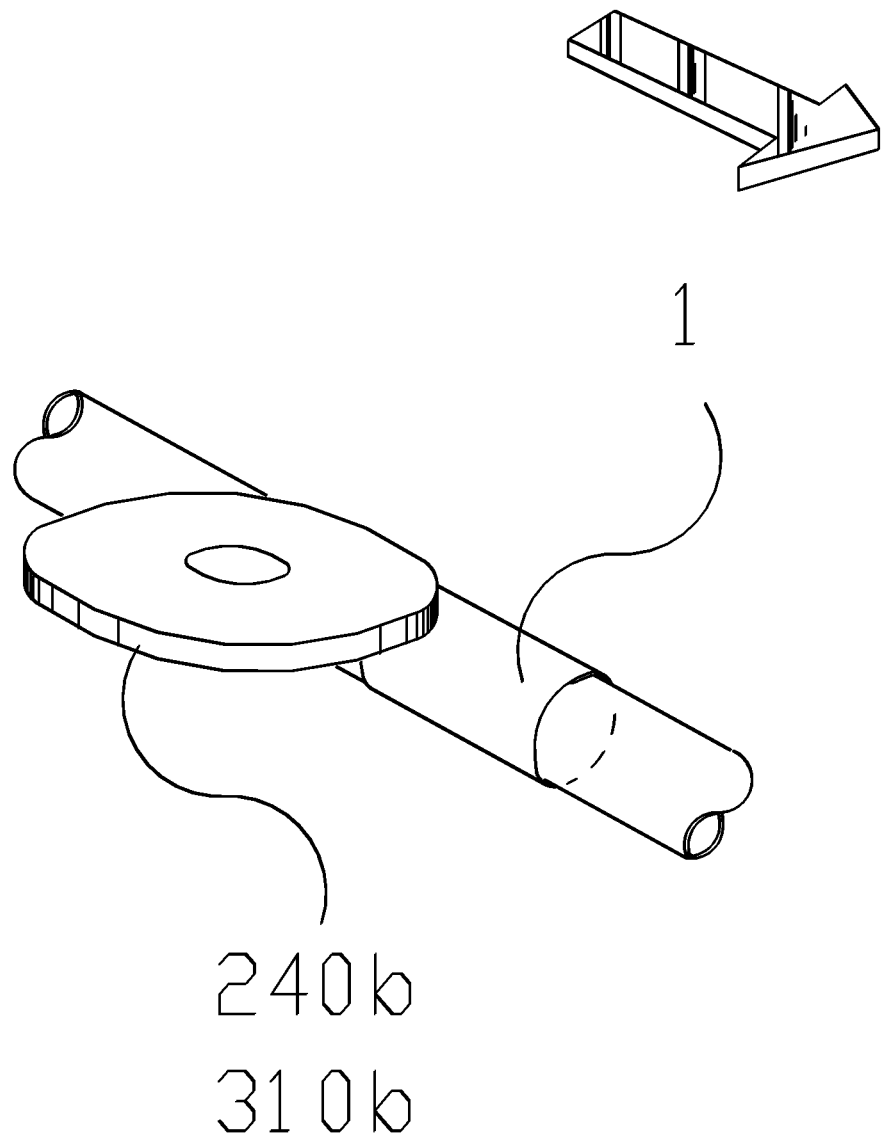
FIG. 9 depicts a second roll down roller in a subsequent stage of operation.

Referring to FIGS. 7-9, down stream of the bottom push up roller 220 is a first roll down roller 310*a*. The first roll down roller 310*a* is disposed lateral to a first side 2*a* of the moving cable 2 and has a channel 230 bounded by side walls 225 and is configured to receive a moving cable having a label partially folded over therewith into a U shape by the bottom push up roller 220. The first roll down roller 310*a* is configured to fold down a shorter side 241 of the label onto the moving cable 2.

In an alternative embodiment, the roll down rollers 310*a*, 310*b* may only have one side wall for folding down the sides of the U shaped label on the cable 2.

Referring to FIGS. 8 and 9, further down stream is a second roll down roller 310*b* disposed lateral to a second side of the cable, opposite to the first side, and has a channel 230 bounded by side walls 225. The second roll down roller 310*b* is configured to receive a moving cable having one shorter side 241 of the label folded down onto the cable 2 by the first roll down roller 310*a*. The second roll down roller 310*b* is configured to fold down a longer side 243 of the label onto the moving cable 2 and over the shorter folded down side, with part of the adhesive side of the label affixing to the top of the shorter folded down side.

Figure 10:
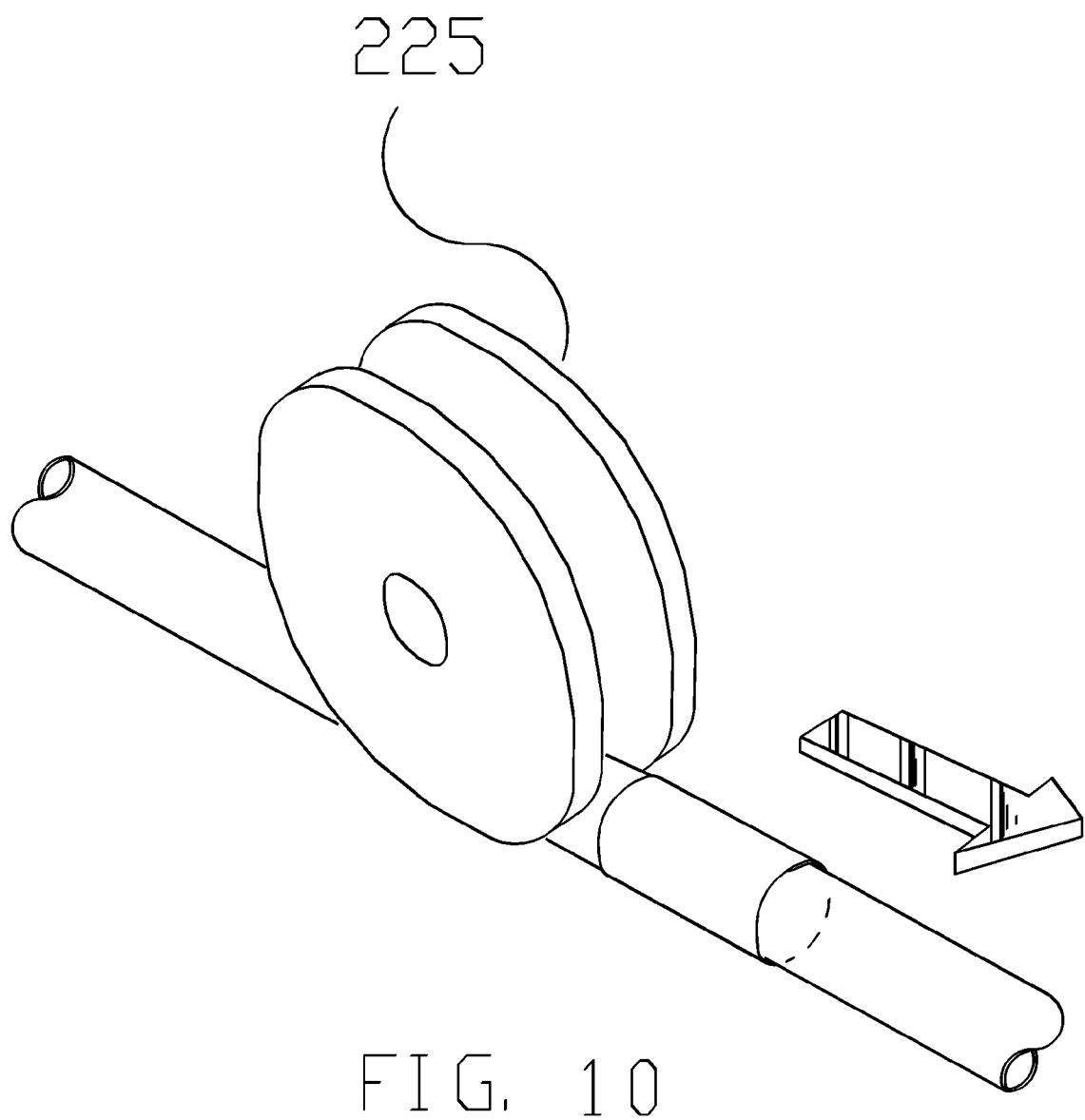
FIG. 10 depicts a top push down roller in operation.
Figure 11:
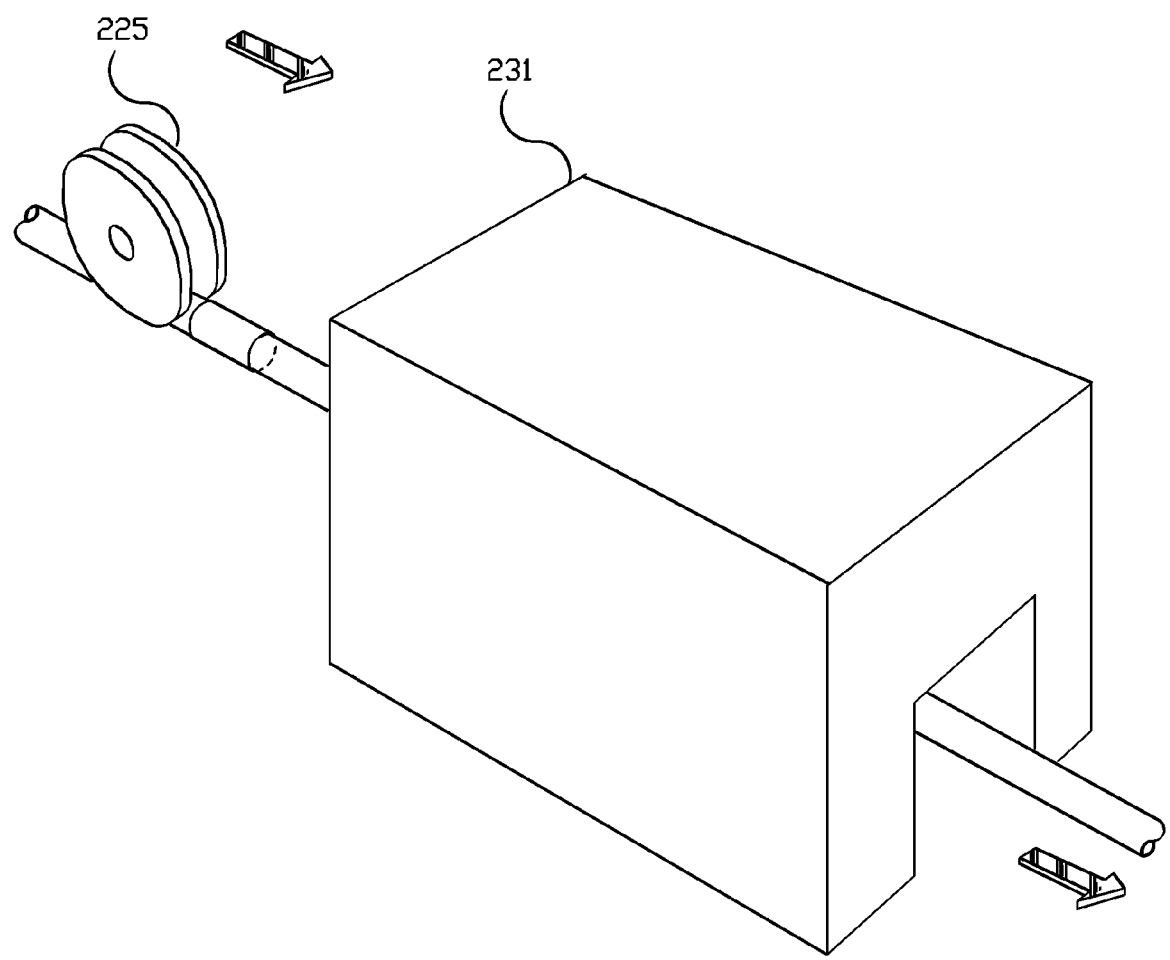
FIG. 11 depicts a heat tunnel component of the apparatus for affixing labels to a moving cable.

Referring to FIGS. 10 and 11, downstream of the roll down rollers 310*a*, 310*b* is a top push down roller 265. In one embodiment, the top push down roller 265 is solid with no channel and presses the label against the cable to secure attachment. In another embodiment, the top push down roller may be of similar shape to the bottom push up roller 220 and include a channel and side walls for receiving the cable 2.

In another embodiment, illustrated in FIG. 11, a heat tunnel 231 may be provided downstream of the rollers. After the label is affixed, the labeled cable may be treated with hot air or radiant heat to cause the label 1 to shrink, preferably circumferentially. The heat tunnel and all the other components of the apparatus for affixing labels to the cable may be configured to rise out of the way when a scrambled or broken cable approaches the apparatus.

In operation, an unlabeled cable 2 moves in a direction in line with its axis as indicated by the thick arrows in the figures. A label dispenser dispenses labels adhered to a backing strip. As the backing strip moves over a peel blade, a label detaches from the backing strip and is caught by the bottom push up roller 220 and is wedged between the cable and the roller 220. As the roller rotates, the label is folded upward over the sides of the cable so that two sides of the label are upright in a U shape. Next, the folded label moves with the cable into the first roll down roller and one side of the label is folded down. Subsequently, the cable with the label having one side folded down enters the second roll down roller 310*b* and a side wall pushes down the other side of the label. Subsequently, the labeled cable is moved under the top push down roller to further press the label against the cable.

Figure 13:
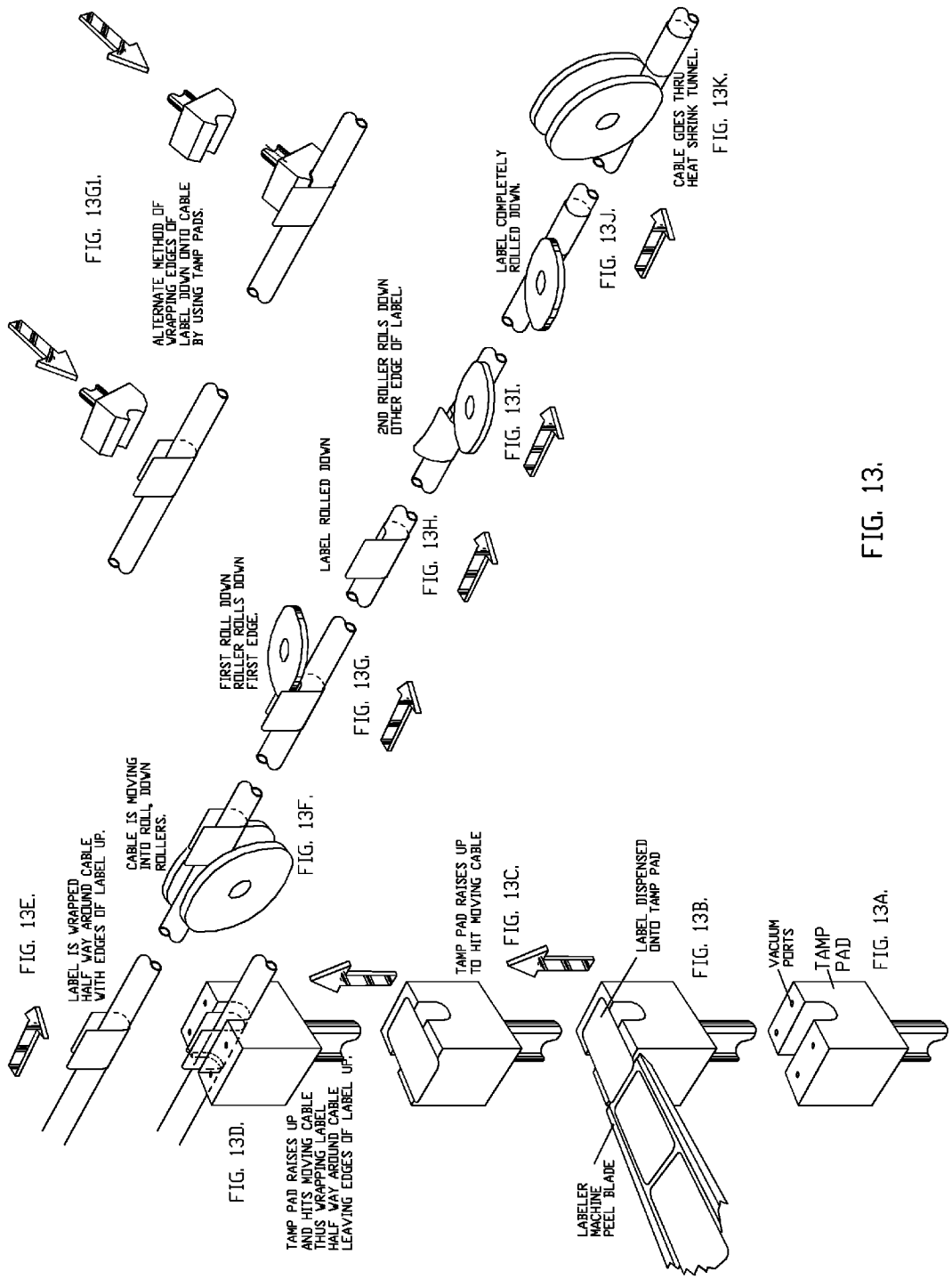
FIG. 13 depicts FIGS. 13A-13L, which depict an operational flow diagram of another embodiment of an apparatus for affixing labels to a moving cable.
Figure 14:
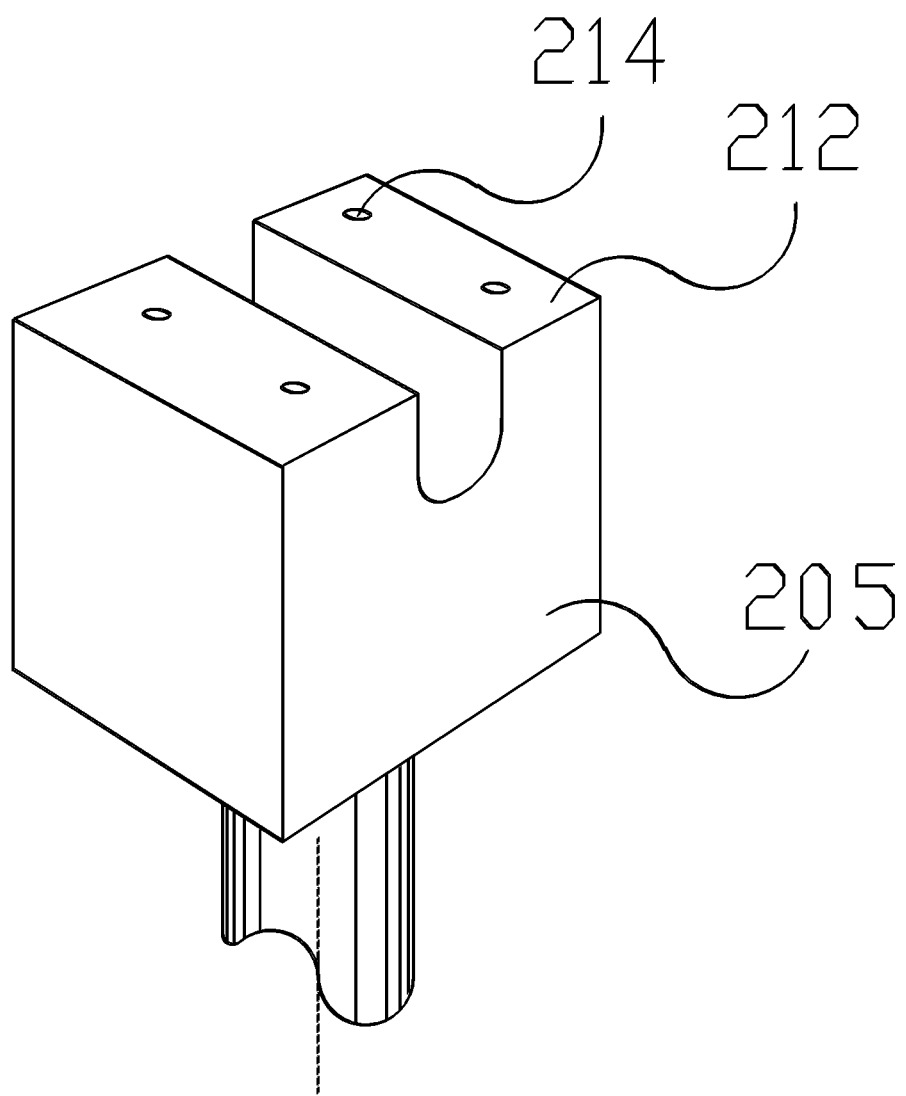
FIG. 14 is a perspective view of a tamp pad having vacuum ports.

In one alternative embodiment, shown in FIG. 13 and FIG. 13A through FIG. 13J, the dispenser and peel blade 305 is oriented to dispense labels perpendicular to the direction of motion of a cable 2 moving along its axis. Referring to FIG. 14, a tamp pad 205 is provided having a U shaped channel 215 disposed in a flat top side 212 of the tamp pad 205. Vacuum ports 214 are disposed on the top side 212 to receive labels having an adhesive side facing up dispensed from the peel blade 305. The tamp pad having received a label, moves upward to engage a moving cable 2 into the channel 215, thus folding the label 2 into a U shape in the channel between the tamp pad 205 and the moving cable 2 as depicted in FIGS. 13B through 13D. Depending on the distance between the tamp pad 205 and the peel blade 307, the sides of the label folded in to a U shape will be of differing heights.

Since the cable is moving, the label 2 has traveled off of the tamp pad 205 and the grooved tamp pad returns to a lowered position away from the moving cable 2 and another adhesive backed label may be dispensed onto the tamp pad 205. Vacuum holes 214 in the grooved tamp pad in the flat area of the grooved tamp pad are commencing with a vacuum condition to hold the label in place for a specified period of time until the grooved tamp pad is pressed against the moving cable and another U shaped attachment configuration cycle is repeated.

The labeled cable may then move into a bottom push up roller 220 for further securing the label to the cable. Next, the folded label moves with the cable into the first roll down roller and the shorter side of the label is folded down. Subsequently, the cable with the label having the shorter side folded down enters the second roll down roller 310b and a side wall pushes down the other taller side of the label. Subsequently, the labeled cable is moved under the top push down roller to further press the label against the cable.

In yet a further embodiment, as shown in FIG. 13G1, a second tamp having a channel configured to press down a shorter side of a U shaped label. Downstream, a third tamp pad may press down the other taller side of the label. The second and third tamp pads may be used in place of the roll down rollers 310a, 310b, but otherwise, the components in the above described embodiments may remain the same.

A heat tunnel with a specified opening and a specified length and a specified wattage for heat generation encompasses the moving labeled cable downstream of the rollers. When the moving labeled cable enters the heat tunnel, the heat is controlled specifically for shrinking the label in a specified way without damaging the text on the label. Independent of how large and bold any text displayed on the label is, the label will not absorb too much heat to damage the label. The heat is controllable for different sizes of labeled cable.

A release system with a specified range of opening causes the labeling and wrapping mechanisms to part or move away from the moving cable. This is to eliminate damage to the labeling and wrapping mechanisms when damaged, frayed, stringy, etc. sections of cable arrive at the labeling wrapping mechanism.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An apparatus for press tamping labels to a continuously fed cable type product comprising:
   a tamping device for applying a label onto moving cable with predetermined force; and
   a roller for pressing the label directly against at least one side of moving cable, wherein the roller comprises:
      a first roller for pressing one label against a first side of the moving cable;
      a second roller for pressing the label against a second side of the moving cable; and
      a third roller for pressing the label perpendicular to the first and second sides of the moving cable;
      wherein a portion of the first roller is mounted to overlap a portion of the second roller for smooth transition of pinching, overlapping the label edges onto the moving cable wherein the first roller comprises a first U shape hollow portion and is mounted at an angle with said first U shape hollow portion directly facing the first side of moving cable, wherein the second roller comprises a second U shape hollow portion and is mounted at an angle with said first U shape hollow portion directly facing the second side of moving cable, wherein the third roller comprises a third U shape hollow portion and is mounted at an angle with said second U shape hollow portion directly facing perpendicular to the first and second sides of the moving cable.

2. The apparatus in claim 1, wherein said tamping device comprises a set of pneumatics, hydraulics for driving the said tamping device onto the moving cable.

3. The apparatus in claim 1, wherein said roller comprises:
   a rounding member;
   a rounding member assembly comprising of but not limited to rubber, springs, pivots, bearings, bushings, brackets, supports, rollers, shoes, wipers, guides, wires;
   a rounding member assembly support for supporting the said assembly; and
   a set of manually adjustable elements for providing flexibility to said rounding member assembly when the moving cable passes the guide roller shoe assembly.

4. The apparatus in claim 1, wherein said tamping device has predetermined substantial force allowing label to maintain initial attached position on sometimes oily said cable.

5. The apparatus in claim 1, wherein said tamping device has a U shaped groove of predetermined depth disposed therein aligned with said cable for creating a U shape to said label during bottoming in said groove with said cable by said tamping device with said label dispensed thereon by forming/pushing said label, into said U shaped groove bottom in said tamping device.

6. The apparatus in claim 1, wherein tamping device has vacuum ports disposed thereon connected to a programmable vacuum system for holding dispensed said label onto said tamping device until such time a predetermined length of said cable has passed, from one application of the said label to the next application of another said label.

7. The apparatus in claim 1, wherein said tamping device is connected to a reciprocating device for advancing said tamping device to said cable, attaching said label to said cable then returns to a label dispenser to capture another sequentially dispensed said label for repeating attachment of another label onto said cable at predetermined intervals.

8. The apparatus in claim 1, wherein a label dispenser contains means for dispensing said label with adhesive side facing away from said tamping device or towards said cable for adhering said label to said cable, further including said label dispenser contains means for dispensing said label on-center or off-center onto said tamping device thus providing subsequent said U shape, having equal or unequal edge lengths.

9. The apparatus in claim 1, wherein said first roller contains means for guiding/pushing, longer of said U shape unequal edge lengths of said label, over to tangent point of diameter of said cable further including second roller contains means for guiding/pushing shorter of said U shape unequal edge lengths of said label, over to tangent point of said cable thus providing pinching together of said unequal edge lengths of said label thereby producing a dorsal fin at, 360 degree joint seal around at crest, tangent point of diameter of said cable, with longer said edge having exposed adhesive further including said third roller contains means for causing said exposed adhesive dorsal fin to bend over thus adhering to said cable.

10. The apparatus in claim 1, wherein said first roller contains means for guiding/pushing, said U shape equal edge lengths of said label, over tangent point of diameter of said cable further including second roller contains means for guiding/pushing other of said U shape equal edge lengths of said label, over tangent point of said cable thus providing overlap of said edges of said label thereby producing the overlap at 360 degree joint seal around said cable at crest of diameter of said cable, with said edges overlapped further including said third roller contains means for causing said overlapped edges to adhere tightly to said cable.

* * * * *